(12) United States Patent
Tennison

(10) Patent No.: US 11,162,765 B2
(45) Date of Patent: Nov. 2, 2021

(54) PORTABLE MODULAR MULTI-CONFIGURATION TARGET STAND

(71) Applicant: CT Metalworks, Inc., San Antonio, TX (US)

(72) Inventor: Casey Tennison, San Antonio, TX (US)

(73) Assignee: CT Metalworks, Inc., San Antonio, TX (US)

( * ) Notice: Subject to any disclaimer, the term of this patent is extended or adjusted under 35 U.S.C. 154(b) by 0 days.

(21) Appl. No.: 15/991,239

(22) Filed: May 29, 2018

(65) Prior Publication Data
US 2019/0368843 A1    Dec. 5, 2019

Related U.S. Application Data

(63) Continuation-in-part of application No. 29/605,516, filed on May 26, 2017, now Pat. No. Des. 847,936.

(51) Int. Cl.
| | | |
|---|---|---|
| *F41J 1/10* | (2006.01) | |
| *F16M 11/22* | (2006.01) | |
| *F16M 11/04* | (2006.01) | |

(52) U.S. Cl.
CPC ............ *F41J 1/10* (2013.01); *F16M 11/04* (2013.01); *F16M 11/22* (2013.01)

(58) Field of Classification Search
CPC ........................................................ F41J 1/10
See application file for complete search history.

(56) References Cited

U.S. PATENT DOCUMENTS

| | | | |
|---|---|---|---|
| 4,433,843 A * | 2/1984 | Bricco | F41J 1/10 248/165 |
| 5,181,719 A * | 1/1993 | Cleveland, III | F41J 1/00 273/409 |
| 5,277,432 A | 1/1994 | Bateman | |
| 8,162,320 B2 | 4/2012 | Medina et al. | |
| (Continued) | | | |

FOREIGN PATENT DOCUMENTS

WO    WO2017208228 A1    12/2017

OTHER PUBLICATIONS

Andy "Guido" Kimble, "Target Stands for Shooting Practice", available online at thekimblefamily.com/index.php/projects/small-projects/target-stands, last updated Apr. 23, 2014 (Year: 2014).*

(Continued)

*Primary Examiner* — Laura Davison
(74) *Attorney, Agent, or Firm* — William H. Quirk; Jesse L. Frizzell; Rosenthal Pauerstein Sandoloski Agather, LLP

(57) ABSTRACT

The present invention relates to a target stand that is modular, configurable, lightweight, and portable. Preferred embodiments have adjustable configurations to enable the target stand to be utilized for different types of gun targets, including rifle and pistol. The target stand disclosed has a base assembly and a cap member preferably constructed of metal. The base assembly includes two support pieces and three transverse pieces that are connected using cut out grooves within the pieces. Multiple types and sizes of target supports can be connected to the base assembly, such as wooden connector posts. Multiple target support sections can be welded to the transverse pieces. The target supports can be secured to the base assembly and cap member using fasteners.

1 Claim, 7 Drawing Sheets

(56) References Cited

U.S. PATENT DOCUMENTS

| | | | |
|---|---|---|---|
| 8,622,394 B2 | 1/2014 | Larue | |
| 8,651,493 B1 | 2/2014 | Adler et al. | |
| 9,163,912 B1* | 10/2015 | Stark | F41J 1/10 |
| 9,658,035 B2 | 5/2017 | Pixton | |
| 9,689,647 B1* | 6/2017 | Dolgoff | F41J 1/10 |
| 9,746,291 B1* | 8/2017 | Crawford | F41J 5/18 |
| 9,829,285 B1* | 11/2017 | Kimblad | F41J 1/10 |
| 2011/0154703 A1* | 6/2011 | Petrovic | A47B 91/00 |
| | | | 40/606.13 |
| 2013/0106059 A1* | 5/2013 | Larue | F41J 1/10 |
| | | | 273/407 |
| 2014/0252719 A1* | 9/2014 | Johnson | F41J 1/10 |
| | | | 273/407 |
| 2015/0276356 A1* | 10/2015 | Cesternino | F41J 9/02 |
| | | | 273/370 |
| 2015/0292842 A1* | 10/2015 | Pixton | F41J 1/10 |
| | | | 273/407 |
| 2016/0202026 A1* | 7/2016 | Temple | F41J 1/10 |
| | | | 273/406 |
| 2016/0209182 A1* | 7/2016 | Sovine | F41J 1/10 |
| 2016/0265885 A1* | 9/2016 | Logan | F41J 9/00 |
| 2017/0336180 A1 | 11/2017 | Sun | |
| 2017/0343324 A1 | 11/2017 | Fernandez | |
| 2017/0350677 A1* | 12/2017 | Sovine | F41J 1/10 |
| 2018/0058827 A1 | 3/2018 | Urban | |
| 2018/0087881 A1* | 3/2018 | Bickel | F41J 7/04 |
| 2018/0120065 A1* | 5/2018 | Pearcey | F41J 1/10 |
| 2018/0216920 A1* | 8/2018 | Allison | F41J 1/10 |
| 2018/0299232 A1* | 10/2018 | Thompson | F41J 1/10 |
| 2018/0340759 A1* | 11/2018 | Brune | F41J 7/04 |
| 2019/0011229 A1* | 1/2019 | Babcock | F41J 7/04 |

OTHER PUBLICATIONS https://www.shootsteel.com/products/12x20-short-range-rifle-target-complete-package.

* cited by examiner

PORTABLE MODULAR MULTI-CONFIGURATION TARGET STAND

CROSS REFERENCE TO RELATED APPLICATIONS

This application is a Continuation-in-Part of prior-filed co-pending U.S. Design patent application No. 29/605,516, filed May 26, 2017, which is incorporated into the present disclosure as if set forth in its entirety.

FIELD

The disclosed invention relates to target stands. More particularly, the present invention relates to a portable target stand that can be assembled in various configurations for different types of gun targets, such as rifles or pistols.

BACKGROUND

Traditional target stands are designed for either steel targets or paper targets and are often extremely bulky in both size and weight, which makes them difficult to transport to and from the shooting range or other location. Some target stands are constructed from wood or metal and are held together with an independent fastener to make an H frame type base structure, which in turn holds an upright post to which a target is affixed. These target stands are heavy and awkward because of the fixed size. In addition, these target stands are not readily disassembled or require a hand or power tool to assemble and disassemble. Furthermore, most target stands come in one type for one set of gun type. Therefore, there is a long felt need in the art for a portable modular multi-configurable lightweight target stand that can be assembled in various configurations for different types of gun targets.

SUMMARY

The present invention relates to a target stand that is modular, configurable, lightweight, and portable. Preferred embodiments have adjustable configurations to enable the target stand to be utilized for different types of gun targets, including rifle and pistol. The target stand disclosed has a base assembly and a cap member preferably constructed of metal. The base assembly includes two support pieces and three transverse pieces that are connected using cut out grooves within the pieces. Multiple types and sizes of target supports can be connected to the base assembly, such as wooden connector posts. Multiple target support sections can be welded to the transverse pieces. The target supports can be secured to the base assembly and cap member using fasteners.

DESCRIPTION OF THE EMBODIMENTS

The following examples are included to demonstrate preferred and alternative embodiments. It should be appreciated by those of ordinary skill in the art that the techniques disclosed in these examples are thought to represent techniques that function well in the practice of various embodiments, and thus can be considered to constitute preferred modes for their practice. However, in light of the present disclosure, those of ordinary skill in the art should appreciate that many changes can be made in the specific embodiments which are disclosed while still obtaining a like or similar result without departing from the spirit and scope of the invention.

Figure 1:
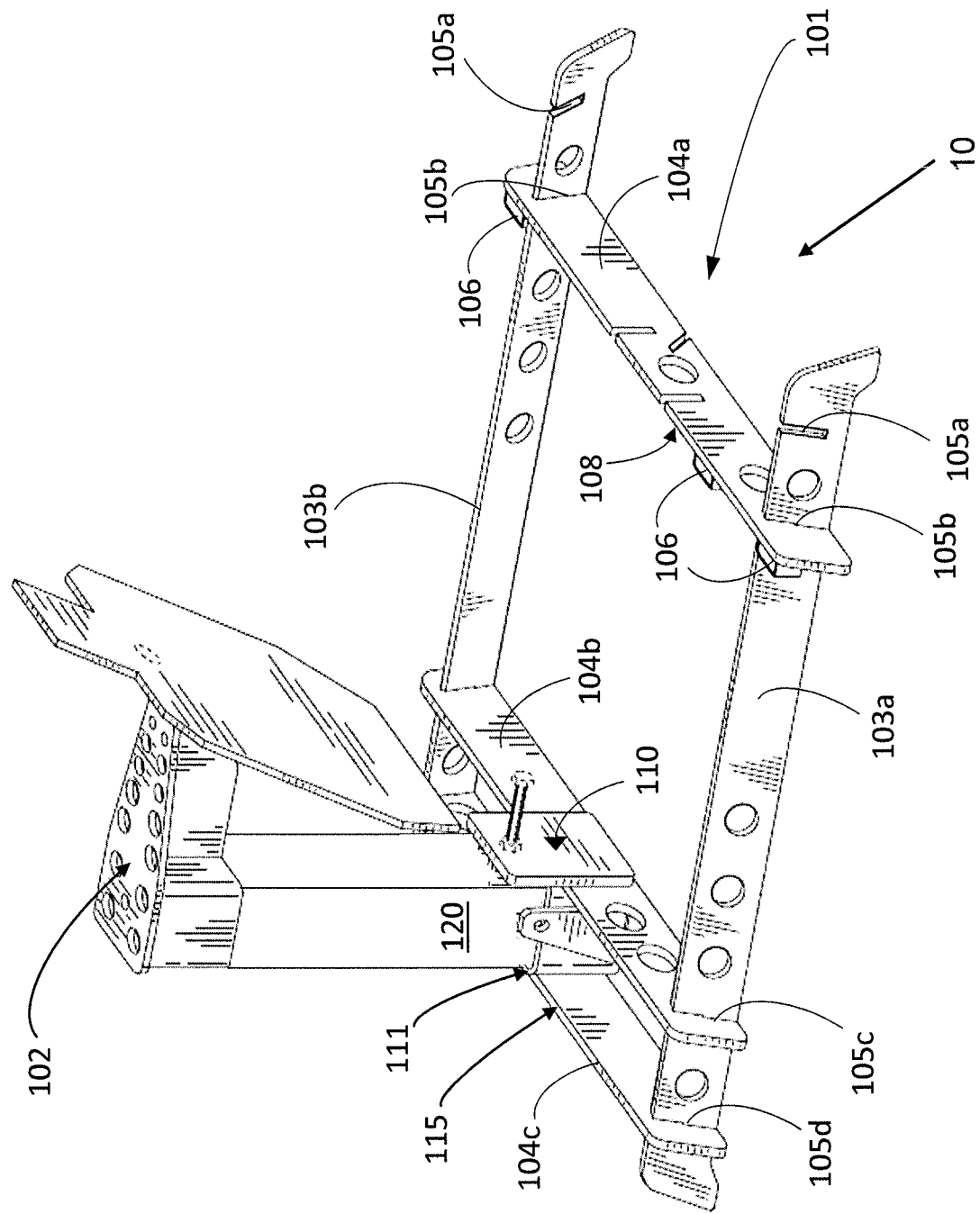
FIG. 1 is a perspective view of a portable target stand system ("target stand").

With reference to FIG. 1, there is shown a perspective view of a portable target stand system 10. FIG. 1 depicts a base assembly 101 (lower section of FIG. 1) and a separate cap member 102 (upper section of FIG. 1). The base assembly 101 and cap member 102 are preferably constructed of metal although other suitable materials are contemplated by the inventor. In use, users may deploy a connector post 120 between the base assembly 101 and the cap member 102, and a target may be connected and supported by the cap member 102. The target stand system 10 includes support pieces 103*a*, 103*b* and transverse piece 104*a* (right side of FIG. 1). The support pieces 103*a*, 103*b* are identical in shape and size but are oriented in opposite directions. Transverse piece 104*a* is placed in grooves 105*b* located in support pieces 103*a*, 103*b*. The term "groove" may be used interchangeably with "notch" and has the same meaning. Although the engagement features in preferred embodiment 10 are grooves but other engagement features may be used. For example, such engagement features may comprise a tongue, a hitch, a pin, a fastener tab, a slot, a notch, a hook, an adhesive, a weld, alone or in any combination. Although FIG. 1 depicts the transverse piece 104*a* held into place by grooves 105*b*, the user may instead place transverse piece 104*a* into identically sized grooves 105*a*. Three small target support sections 106 are welded to the back surface 108 of transverse piece 104*a*. Target support sections 106 are rectangular shaped with hollow openings, preferably sized between ½ and 1 inch wide and 1½ and 2 inches long. The hollow openings allow a user to insert target supports (not shown). The locations of target support sections 106 in FIG. 1 are shown as an example and target support sections 106 may be located at different areas of the back surface 108.

On the left side of FIG. 1, there are shown two transverse pieces 104*b*, 104*c* connected to a target support section 110 and placed in grooves 105*c*, 105*d*. Grooves 105*c*, 105*d* are identically sized and shaped compared to grooves 105*a*, 105*b*, preferably between ¼ and ½ inches wide and between 1½ and 2 inches deep. The transverse pieces 104*b*, 104*c* are welded to target support section 110 so that one large transverse member 115 can be moved as a single unit. Transverse pieces 104*b*, 104*c* are identically sized and shaped but are oriented in opposite directions. Target support section 110 is rectangular shaped with a hollow opening 111, preferably sized between 3 and 4 inches wide and between 4½ and 5½ inches long.

Figure 2:
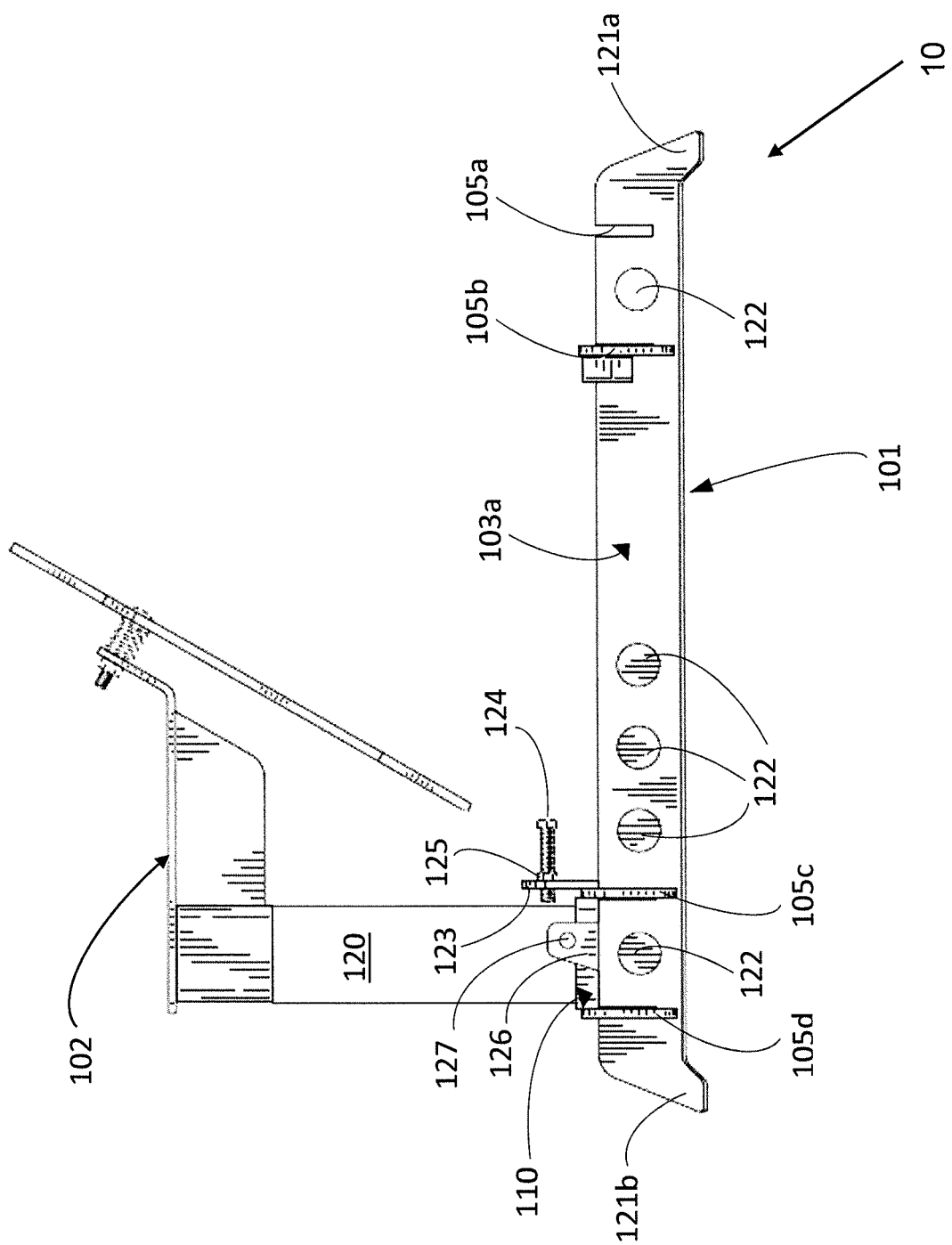
FIG. 2 is a left side elevational view of the TARGET STAND of FIG. 1.

Turning to FIG. 2, there is shown a left side elevational view of portable target stand system 10. Support piece 103*a* includes support feet 121a, 121b so that the main body of support piece 103a is raised above a support surface (not shown). Support feet 121a, 121b provide stability for the base assembly 101, which is especially important considering the target stand system 10 will often be deployed on uneven surfaces such as the ground. The support feet 121a, 121b can elevate support piece 103a one to two inches above the ground, for example. The support feet 121a, 121b may be of any suitable shape, configuration, or size. The support piece 103a may include circular holes 122 with preferably between 1 and 2 inch diameters. Although five circular holes 122 are shown as an example in FIG. 2, more or less holes may be included.

On the left side of FIG. 2, a primary support section 123 is welded to transverse piece 104b. A fastener 124 and nut 125 is used to secure a connector post 120 to the target support section 110 of base assembly 101. The connector post 120 may be used to connect the base assembly 101 to the cap member 102. Although the fastener 124 shown is a bolt, other suitable fasteners are contemplated by the inventor. A secondary support section 126 is welded to target support section 110. A fastener (not shown) may be placed in circular hole 127 to provide redundant support in securing the connector post 120 to target support section 110.

The full length of support piece 103a (including the protruding support feet 121a, 121b) is preferably between 35 and 37 inches. Each support foot 121a, 121b protrudes between 1½ and 2 inches outward. Therefore, the length at the top of support piece 103a is preferably between 31 and 34 inches. The height of support piece 103a is preferably between 3 and 4 inches. There are four grooves 105a-105d with widths of between ¼ and ½ inches. Turning to the right side of FIG. 2, groove 105a is preferably located between 1½ and 2 inches from the top right of support piece 103a. Groove 105b is preferably located between 3 and 5 inches to the left of groove 105a. Groove 105c is preferably located between 18½ and 20½ inches to the left of groove 105b. Groove 105d is preferably located between 3 and 5 inches to the left of groove 105c and between 1½ and 2 inches from the top left of support piece 103a.

Figure 3:
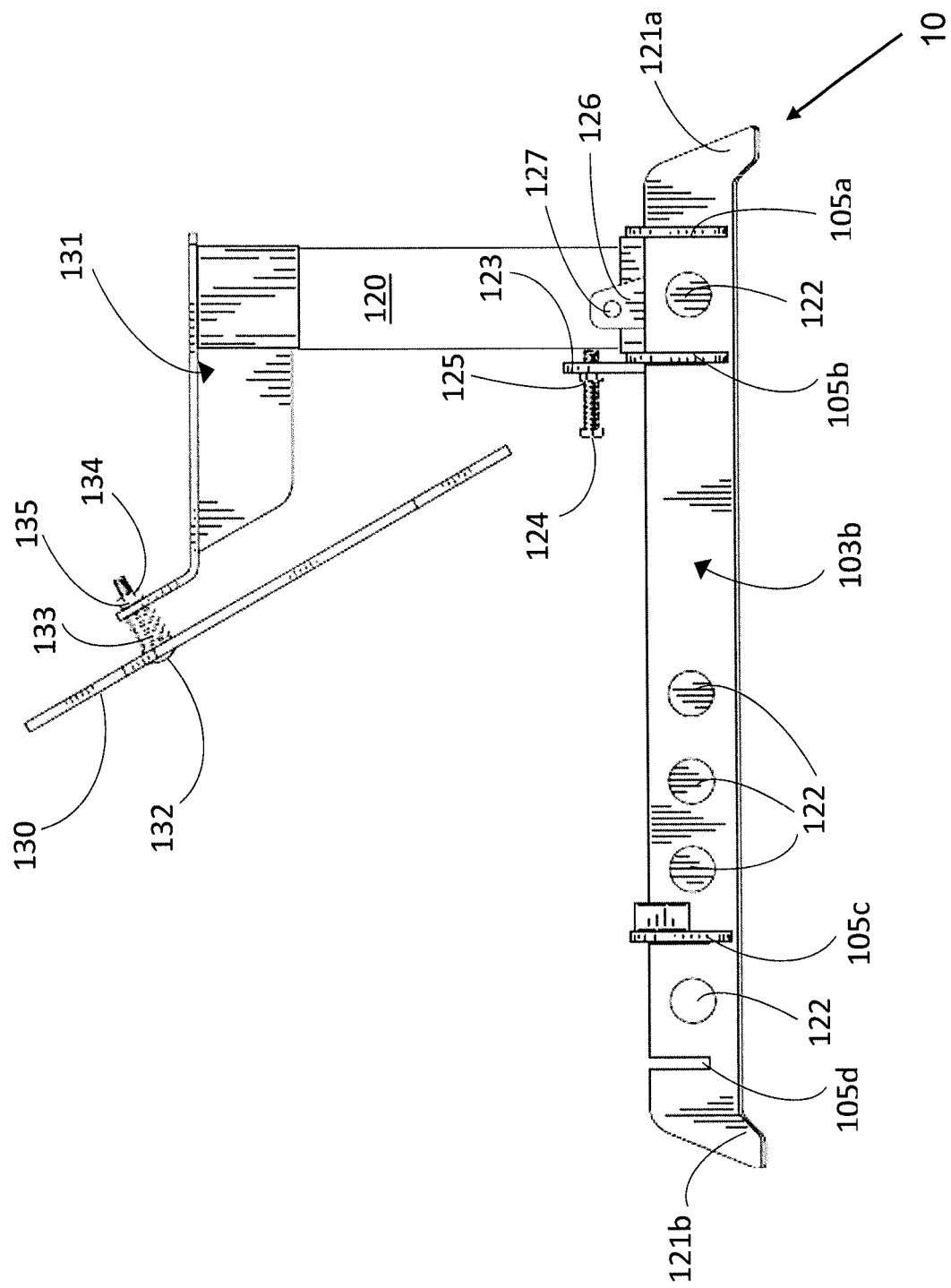
FIG. 3 is a right side elevational view of the TARGET STAND of FIG. 1.

Turning to FIG. 3, there is shown a right side elevational view of portable target stand system 10. Since support pieces 103a, 103b are identical but oriented in opposite directions, FIG. 3 is a mirror image of FIG. 2. A secondary support section 126 is welded to target support section 110. A fastener (not shown) may be placed in circular hole 127 to provide redundant support in securing the connector post 120 to target support section 110. The cap member 102 includes a target mount 130 that is attached to an intermediate connector 131 using a fastener 132, spring 133, nut 134, and washer 135. Although the fastener 132 shown is a bolt, other suitable fasteners are contemplated by the inventor. A spring 133 is used to enable flexibility of the cap member 102 while experiencing mechanical stress from bullet impact. The fastener 132 can easily be removed so the user can replace the target mount 130 when necessary.

Figure 4:
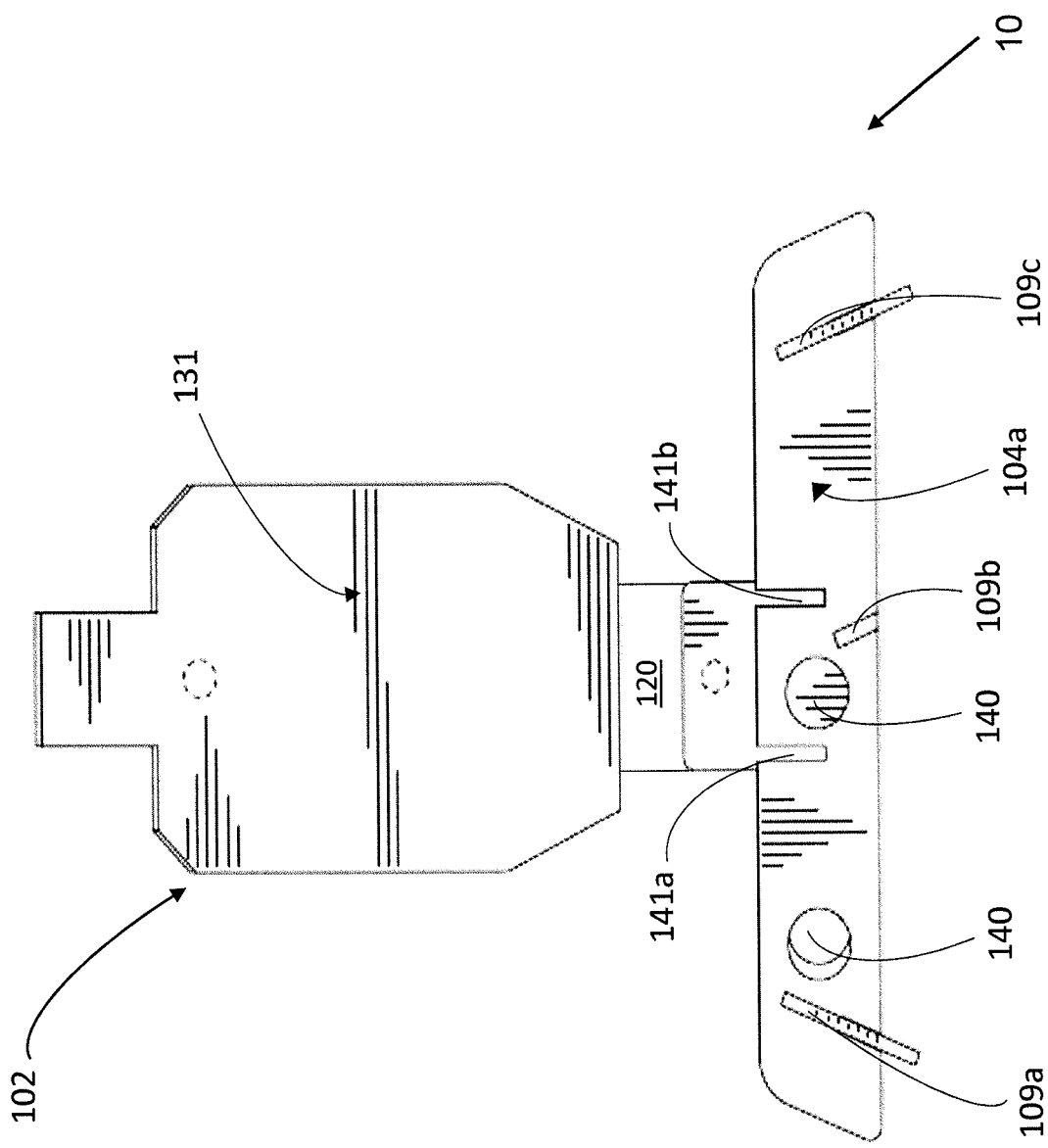
FIG. 4 is a front elevational view of the TARGET STAND of FIG. 1.

Turning to FIG. 4, there is shown a front elevational view of portable target stand system 10. The full length of the bottom of transverse piece 104a is preferably between 27 and 29 inches. The bottom of transverse piece 104a extends longer than the top and thus the top length is preferably between 23½ and 25½ inches. The transverse piece 104a may include circular holes 140 with preferably between 1½ and 2½ inch diameters. Although two circular holes 140 are shown as an example in FIG. 2, more or less holes may be included. Groove 109a is preferably located between 2 and 4 inches from the bottom left edge of transverse piece 104a.

Groove 109b is preferably located between 14¼ and 16¼ inches from the bottom left edge. On the right side of transverse piece 104a, groove 109c is preferably located between 2 and 4 inches from the bottom right edge. Grooves 109a-c are preferably between 1 and 2 inches deep and between ¼ and ½ inches wide. Groove 141a is preferably located between 10½ and 12½ inches from the bottom left edge and groove 141b is located between 3 and 5 inches to the right of groove 141a. Grooves 141a-141b are preferably 1½ to 2½ inches deep and between ¼ and ½ inches wide.

Figure 5:
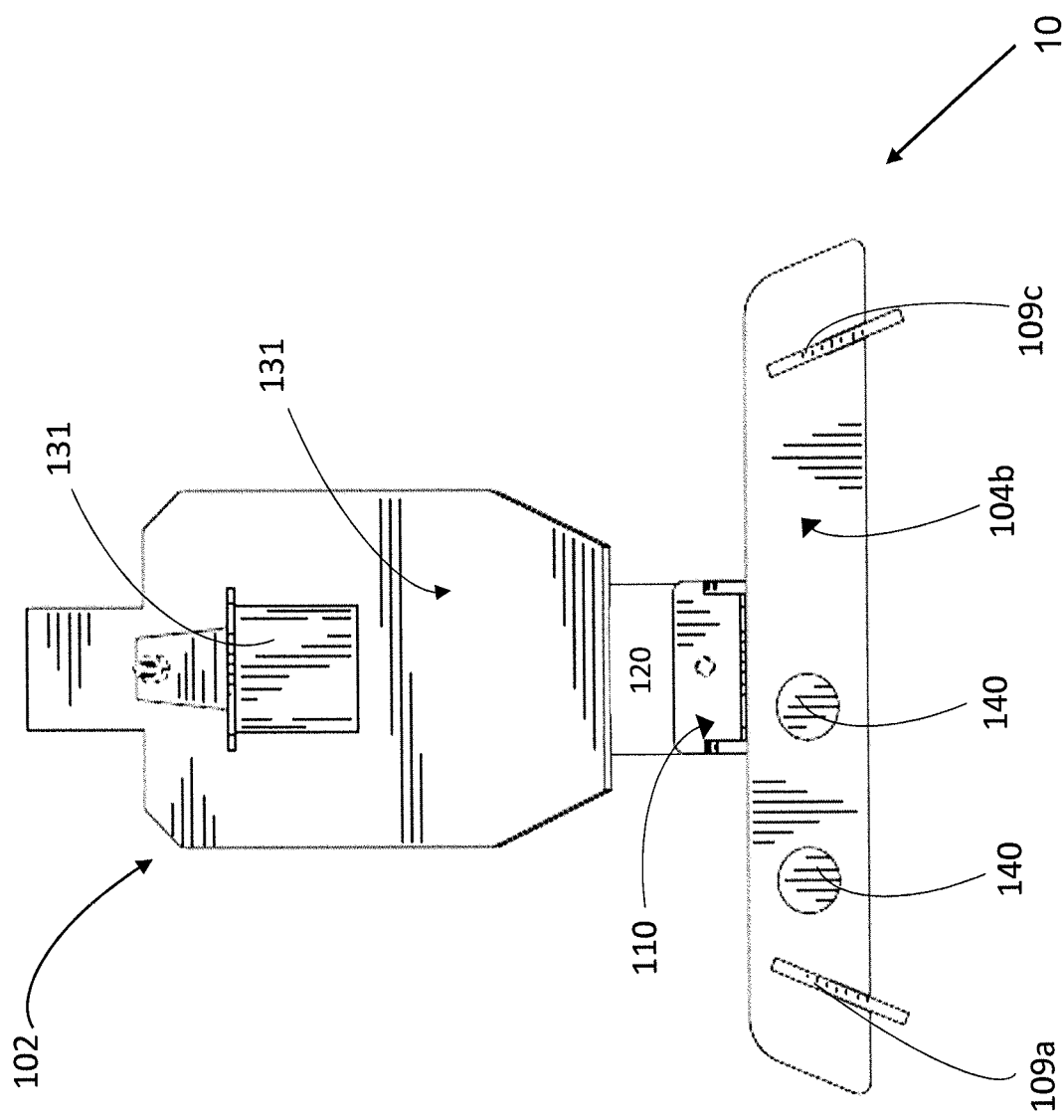
FIG. 5 is a rear elevational view of the TARGET STAND of FIG. 1.

Turning to FIG. 5, there is shown a rear elevational view of portable target stand system 10. Transverse piece 104b is preferably the same size and shape as transverse piece 104a. Transverse piece 104b differs in that it does not have grooves in the middle, such as the grooves 109b, 141a-141b in transverse piece 104a. As previously described, transverse pieces 104b, 104c (shown in FIG. 1) are welded to target support section 110 so that one large transverse member 115 can be moved as a single unit.

Figure 6:
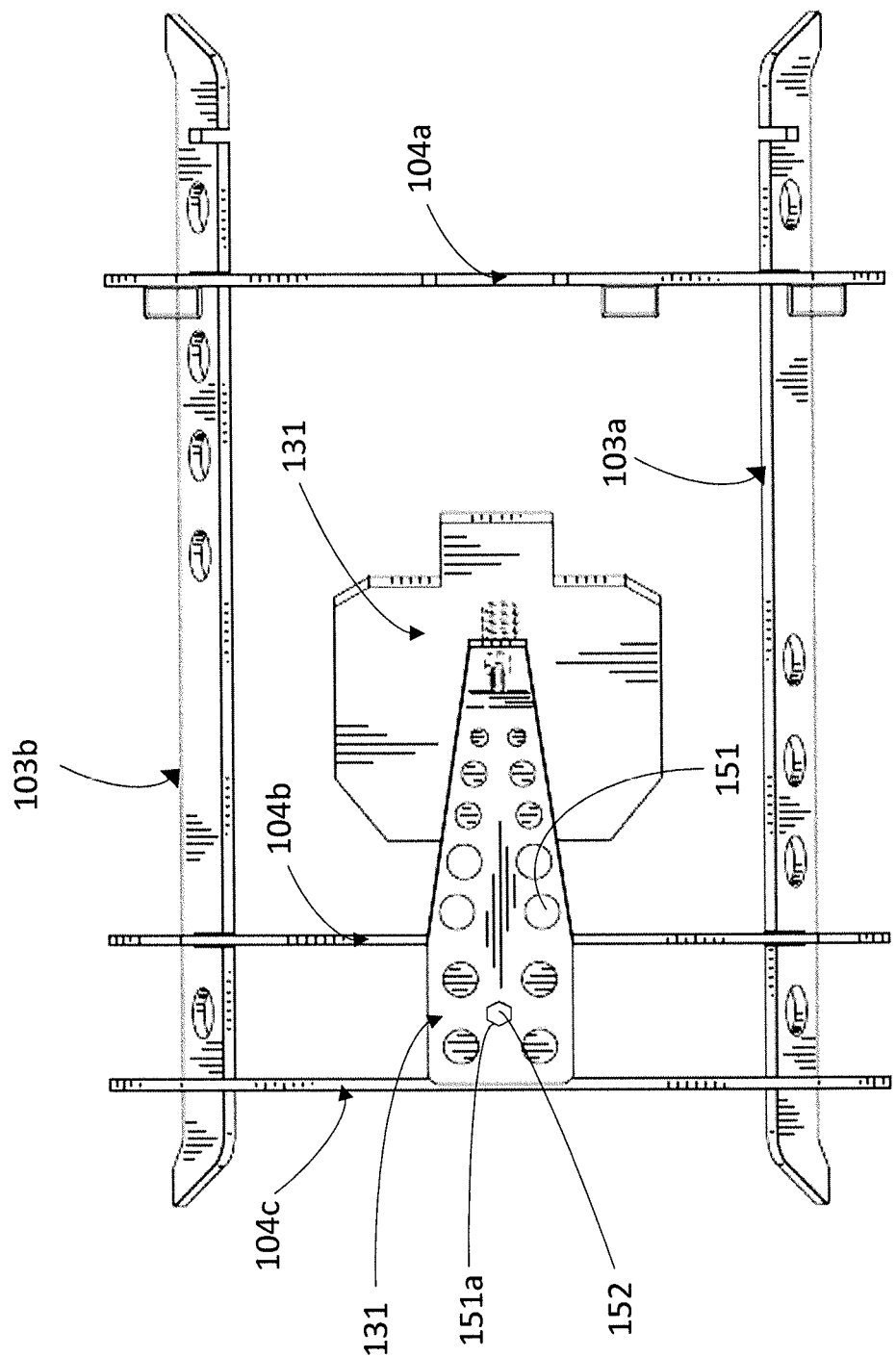
FIG. 6 is a top plan view of the TARGET STAND of FIG. 1.

Turning to FIG. 6, there is shown a top plan view of portable target stand system 10. Intermediate connector 131 may include circular holes 151 of differing sizes. Four larger holes and one smaller hole 151a are located on the left side of intermediate connector 131 and are directly above a connector post 120. These five circular holes can be used with fasteners to secure the intermediate connector 131 to a connector post 120. A fastener 152 is placed in hole 151a for securing intermediate connector 131 to connector post 120. Although the example shown in FIG. 6 has 15 holes, more or less holes may be included. The holes can be used to lower the weight and cost of materials of the stand while still providing the strength and structural support required.

Figure 7:
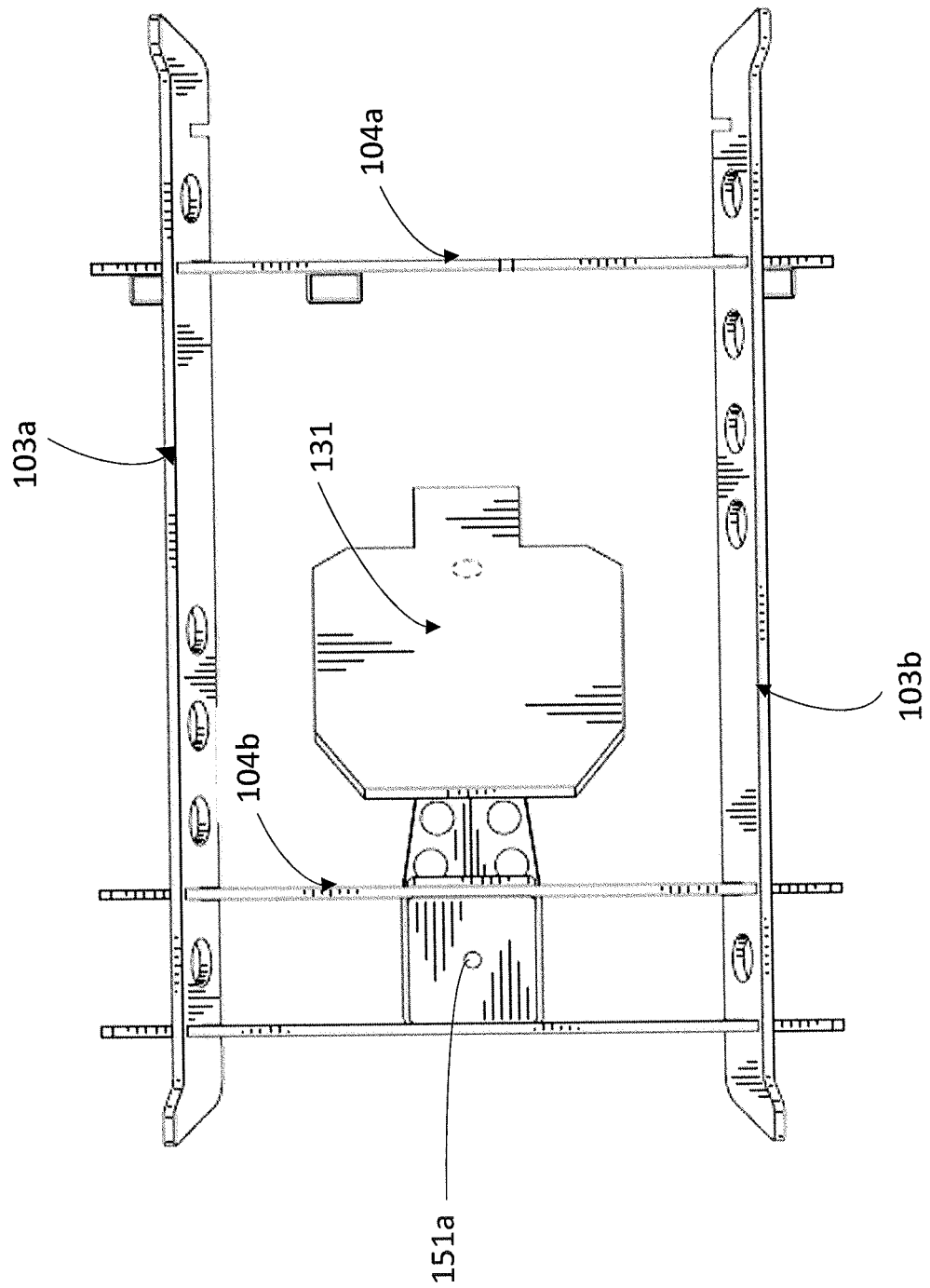
FIG. 7 is a bottom plan view of the TARGET STAND of FIG. 1.

Turning to FIG. 7, there is shown a bottom plan view of portable target stand system 10. As previously described, target support section 110 is rectangular shaped with a hollow opening 111 at the top, preferably sized between 2⅝ and 4⅝ inches wide and between 4 and 6 inches long. The bottom surface 112 of target support section 110 is closed except for a small circular hole 161 in the center of surface 112. The small circular hole 161 can be used with a fastener to secure a connector post 120 to the bottom surface 112 of target support section 110.

While the present invention has been described according to its preferred and alternate embodiments, those of ordinary skill in the art will understand that modifications to the disclosed embodiments may be made without departing from the scope and meaning of the appended claims.

The invention claimed is:

1. A portable target stand, comprising:
   a) a base assembly comprising:
      1) a first support piece and a second support piece, each support piece being between 35 and 37 inches long and between 3 inches and 4 inches high, each support piece further having four grooves between ¼ inch and ½ inch wide and between 1½ and 2½ inches deep, and each support piece further having five circular holes between 1 and 2 inches in diameter; and
      2) a first transverse piece, a second transverse piece, and a third transverse piece, wherein each transverse piece is between 27 and 29 inches long, each transverse piece further having at least two grooves between ¼ inch and ½ inch wide and between 1½ and 2½ inches deep, and each transverse piece further having two circular holes between 1½ and 2½ inches in diameter;

b) wherein the first transverse piece has a first target support section, a second target support section, and a third target support section welded to one side and further has an additional three grooves between ¼ inch and ½ inch wide and between 1½ and 2½ inches deep;
c) wherein the three target support sections are rectangular shaped with hollow openings between 1½ and 2 inches long, and ½ and 1 inch wide;
d) wherein the second and third transverse pieces are welded to a connector post support section, and wherein the connector post support section is rectangular shaped with a hollow opening between 3 and 4 inches wide, and 4½ and 5½ inches long;
e) wherein the connector post support section is further welded to a primary support section, wherein the primary support section has a fastener and nut to secure the primary support section to a connector post;
f) wherein the connector post support section is further welded to two secondary support sections, wherein each secondary support section provides additional support to the connector post;
g) wherein the grooves of each transverse piece are securable to the grooves of the first and second support pieces to secure each transverse piece to the first and second support pieces; and
h) a cap member comprising:
1) a target mount, an intermediate connector, a target mount fastener, a spring, a washer, and a nut;
2) wherein the target mount is securable to the intermediate connector using the target mount fastener, the spring, the washer, and the nut; and
3) wherein the intermediate connector has fifteen circular holes and an intermediate fastener, and wherein the intermediate connector is securable to the connector post using the intermediate fastener.

* * * * *